US011747970B2

(12) United States Patent
Ross et al.

(10) Patent No.: US 11,747,970 B2
(45) Date of Patent: Sep. 5, 2023

(54) INTERACTIVE GRAPHICAL DISPLAY OF MULTIPLE OVERLAPPING HYPOTHESES OR DOCUMENT VERSIONS

(71) Applicant: International Business Machines Corporation, Armonk, NY (US)

(72) Inventors: Steven I. Ross, S Hamilton, MA (US); Stephanie Houde, Belmont, MA (US); Fernando Carlos Martinez, La Plata (AR); Justin David Weisz, Scarsdale, NY (US); John Thomas Richards, Honeoye Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 17/482,536

(22) Filed: Sep. 23, 2021

(65) Prior Publication Data
US 2023/0088175 A1   Mar. 23, 2023

(51) Int. Cl.
G06F 3/04842   (2022.01)
G06F 8/41   (2018.01)
(Continued)

(52) U.S. Cl.
CPC ............ *G06F 3/04842* (2013.01); *G06F 8/33* (2013.01); *G06F 8/425* (2013.01); *G06F 8/427* (2013.01);
(Continued)

(58) Field of Classification Search
CPC . G06F 8/425; G06F 8/427; G06F 8/51; G06F 8/71; G06F 40/58; G06F 3/04842
(Continued)

(56) References Cited

U.S. PATENT DOCUMENTS

| 5,067,166 A | 11/1991 | Ito |
| 6,847,979 B2 | 1/2005 | Allemang et al. |

(Continued)

FOREIGN PATENT DOCUMENTS

| CN | 111985220 A | 11/2020 |
| CN | 113947072 A | 1/2022 |

OTHER PUBLICATIONS

Chen et al., "By the Community & for the Community: A Deep Learning Approach to Assist Collaborative Editing in Q&A Sites," Proceedings of the ACM on Human-Computer Interaction 1.CSCW (2017): 1-21.

Hata et al., "Learning to generate corrective patches using neural machine translation," Journal of Latex Class Files, vol. 14, No. 8, Aug. 2015, 20 pages.

(Continued)

*Primary Examiner* — Geoffrey R St Leger
(74) *Attorney, Agent, or Firm* — CANTOR COLBURN LLP; Caleb Wilkes

(57) ABSTRACT

Embodiments relate to interactive graphical display. A request is processed by a generative system to generate multiple hypotheses of an output in response to the request, a primary hypothesis of the multiple hypotheses having a highest confidence for the output, multiple secondary hypotheses of the multiple hypotheses having a lower confidence than the highest confidence. At least one region of divergence is determined from the primary hypothesis by the multiple secondary hypotheses, the at least one region of divergence having alternatives in the multiple secondary hypotheses, the alternatives in the multiple secondary hypotheses differing from the primary hypothesis. A graphical user interface displays the at least one region of divergence in the primary hypothesis and alternatives in the multiple secondary hypotheses for the at least one region of divergence, the alternatives and primary hypothesis for the at least one region of divergence being displayed as selectable options for a user.

17 Claims, 14 Drawing Sheets

(51) Int. Cl.
*G06F 40/58* (2020.01)
*G06F 8/33* (2018.01)
*G06F 8/51* (2018.01)
*G06N 3/0475* (2023.01)

(52) U.S. Cl.
CPC ............... *G06F 8/51* (2013.01); *G06F 40/58* (2020.01); *G06N 3/0475* (2023.01)

(58) Field of Classification Search
USPC .................................. 717/120, 136, 137, 143
See application file for complete search history.

(56) References Cited

U.S. PATENT DOCUMENTS

| | | | |
|---|---|---|---|
| 7,698,124 | B2 | 4/2010 | Menezes et al. |
| 8,374,979 | B2 | 2/2013 | Zhou et al. |
| 9,015,680 | B1 * | 4/2015 | Shropshire .......... G06F 11/3624 717/126 |
| 9,063,949 | B2 | 6/2015 | Zhai et al. |
| 9,760,542 | B1 | 9/2017 | Lai et al. |
| 10,713,432 | B2 | 7/2020 | Goyal et al. |
| 2007/0130563 | A1 * | 6/2007 | Elgazzar ................ G06F 40/58 717/137 |
| 2013/0268511 | A1 * | 10/2013 | Bailey ................... G06F 16/957 707/E17.141 |
| 2014/0136497 | A1 | 5/2014 | Georgiev et al. |
| 2015/0051896 | A1 | 2/2015 | Simard et al. |
| 2015/0136497 | A1 | 5/2015 | Morin |
| 2015/0242932 | A1 * | 8/2015 | Beguin .............. G06Q 30/0633 705/26.8 |
| 2017/0161264 | A1 * | 6/2017 | Zhao ....................... G06F 40/58 |
| 2017/0169346 | A1 | 6/2017 | Rinkus |
| 2017/0220535 | A1 | 8/2017 | Olsen et al. |
| 2018/0308583 | A1 | 10/2018 | Yegnanarayanan |
| 2020/0086760 | A1 | 3/2020 | Rini |
| 2021/0042475 | A1 | 2/2021 | Zhang et al. |

OTHER PUBLICATIONS

Lachaux et al., "Unsupervised Translation of Programming Languages", Sep. 22, 2020, 21 pages.

Li et al., "MISS: An Assistant for Multi-Style Simultaneous Translation," Proceedings of the 2021 Conference on Empirical Methods in Natural Language Processing: System Demonstrations, 2021, pp. 1-10.

List of IBM Patents or Patent Applications Treated as Related (Appendix P); Date Filed: Oct. 25, 2022; 2 pages.

Mesbah et al., "DeepDelta: Learning to Repair Compilation Errors," Proceedings of the 2019 27th ACM Joint Meeting on European Software Engineering Conference and Symposium on the Foundations of Software Engineering (ESEC/FSE '19), 2019, ACM, 12 pages.

Ross, "Interactive Editing of a Machine-Generated Document", U.S. Appl. No. 18/047,683, filed Oct. 19, 2022.

Vaswani et al., "Attention is All You Need", 31st Conference on Neural Information Processing Systems (NIPS 2017), 15 pages.

Diffuse, [online]; [retrieved on Sep. 3, 2021]; retrieved from the Internet http://diffuse.sourceforge.net/.

Falleri, "Fine-grained and Accurate Source Code Differencing"; ASE'14, Sep. 15-19, 2014; 12 pages.

Grace Period Disclosure; Weisz, "Perfection Not Required? Human-AI Partnerships in Code Translation", Proceedings of 26th International Conference on Intelligent User Interfaces (IUI '21). ACM, New York, NY; Apr. 8, 2021, 18 pages.

Myers, "An O(ND) Difference Algorithm and Its Variations"; National Science Foundation; 1986; 15 pages.

Whitaker, "Understanding Changes in n-way Merge: Use-cases and User Interface Demonstrations", DChanges '14 Sep. 16, 2014, 4 pages.

Yoon, "Supporting Selective Undo in a Code Editor", 2015 IEEE/ACM 37th IEEE International Conference on Software Engineering, May 16-24, 2015, 11 pages.

Chen, "Nonlinear Revision Control for Images", ACM Transactions on Graphics, vol. 30, Issue 4, Jul. 2011, 10 pages.

* cited by examiner

| REGION 1 (E.G., TOKEN(S) OR CHARACTER(S)) | HIGHEST CONFIDENCE TRANSLATED DOCUMENT | | ALTERNATIVE TRANSLATED DOCUMENT 1 | | ALTERNATIVE TRANSLATED DOCUMENT 2 | | ••• | ALTERNATIVE TRANSLATED DOCUMENT N | CONFIDENCE SCORE |
|---|---|---|---|---|---|---|---|---|---|
| | X==1 | .9 | X==1 | .7 | X==1 | .5 | | X==1 | .4 |
| REGION 2 | RED | .8 | BLUE | .7 | RED | .5 | | BLUE | .7 |
| REGION 3 | J=K+1 | .7 | J=K+1 | .5 | J=K+1 | .5 | | J=K+1 | .6 |
| ••• | | | | | | | | | |
| REGION X | J=K+1 | .7 | J=K-1 | .5 | J=K-1 | .5 | | J=K-1 | .6 |

FIG. 7

```
1   def two_sum( nums , target ) :
2       """
3       From Leet . com 1 - Pass Solution
4
5       Given an array of integers, return indices of the two numbers
6       such that they add up to a specific target .
7
8       You may assume                                    solution,
9       and you may no
10
11      : param nums :
12      : param target
13      : return :
14      """
15      d = {}
16      for i in nums :
17          complement = target - i
18          if d.has_key ( complement ) :
19              return [ d [ complement ] , i ]
20          d [ i ] = i
21      raise ValueError ( "No two sum solution ")
```

Alternate translations    ×

◉ nums
○ range (lan (nums))

☑ change related references

FIG. 8

Code Translator

Python Translation

```
1   def two_sum ( nums , target ) :
2       """
3       From Leet . com 1 - Pass Solution
4
5       Given an array of integers, return indices of the two
6       numbers such that they add up to a specific target .
7
8       You may assume that each input would have exactly one
9       solution, and you may not use the same element twice .
10
11      : param nums :
12      : param target :
13      : return :
14      """
15      d = {}
16      for i in nums :
17          complement = target - i
18          if d.has_key ( complement ) :
19              return [ d [ complement ] , i ]
20          d [ i ] = i
21      raise ValueError ( "No two sum solution ")
```

AI Comments and Suggestions

Alternate Translation ✓ ✗
twoSum

Alternate Translation ✓ ✗
( len ( nums ) )
+ 2 related changes

Consistency ✓ ✗
Single space convention

Documentation
For loop optimization in Python 3
Dictionary use
alskdjf;akjslkja;lksdjflkj

FIG. 9

```
Code Translator
   Python Result                                                    902
 1   def two_sum ( nums , target ) :
     def twoSum ( nums , target ) :                           ✓ ✗
 2   """
 3   From Leet . com 1 - Pass Solution
 4
 5   Given an array of integers, return indices of the two
 6   numbers such that they add up to a specific target .
 7
 8   You may assume that each input would have exactly one
 9   solution, and you may not use the same element twice .
10
11   : param nums :
12   : param target :
13   : return :
14   """
15     d = {}
16                                                                 902
17     for i in nums :
       for i in range ( len ( nums ) ) :                      ✓ ✗
18       complement = target - i
19       if d.has_key ( complement ) :
20         return [ d [ complement ] , i ]
21         return [ d [ complement ] , num[i] ]               ✓ ✗
       d [ i ] = i
       d [ num[i] ] = i                                       ✓ ✗
22     raise ValueError ( "No two sum solution ")
```

FIG. 10A

```
 CodeTranslation-1628083395315.py X
er > globalStorage > martferc.code-translator >  CodeTranslation-1628083395315.py
    Translate to Java | Generate documentation
 1  def pascal ( cls , n ) :
 2      triangle = [ ]
 3      for line in range (1 , n + 1 ) :
 4          row = [ ]
 5          C = 1
 6          for i in range (1 , line + 1 ) :
 7              row.append ( C )
 8              C = C * ( line - 1 ) / i      1002
 9          triangle.append ( row )
10      return triangle
11
```

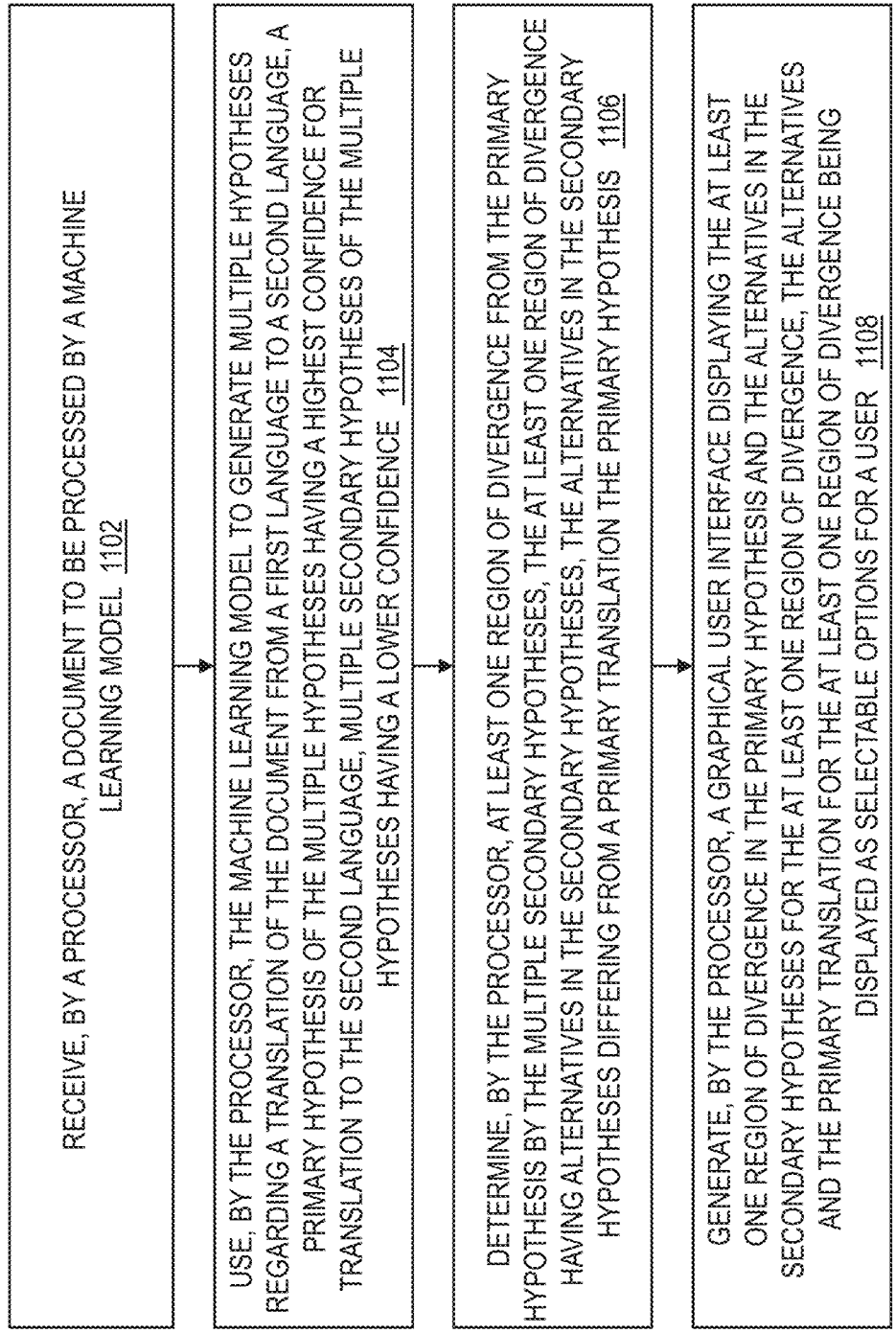

INTERACTIVE GRAPHICAL DISPLAY OF MULTIPLE OVERLAPPING HYPOTHESES OR DOCUMENT VERSIONS

STATEMENT REGARDING PRIOR DISCLOSURES BY THE INVENTOR OR A JOINT INVENTOR

The following disclosures are submitted under 35 U.S.C. 102(b)(1)(A): DISCLOSURES: "Perfection Not Required? Human-AI Partnerships in Code Translation" by Justin D. Weisz and others, published Apr. 14, 2021, IUI '21: 26th International Conference on Intelligent User Interfaces, pages 402-412.

BACKGROUND

The present invention generally relates to computer systems, and more specifically, to computer-implemented methods, computer systems, and computer program products configured and arranged for interactive graphical display of multiple overlapping hypothesis and/or document versions.

A variety of computerized applications, particularly those involving machine intelligence, may generate multiple possible alternative solutions in the course of performing their processing. This is particularly common in applications such as speech recognition, language translation, and other deep learning applications, but can arise with other generative solutions as well. Often the highest confidence alternative is reported by the application, yet the correct or best alternative from the human user's perspective might not be the one that the system is most confident in.

SUMMARY

Embodiments of the present invention are directed to computer-implemented methods for interactive graphical display of multiple overlapping hypothesis and/or document versions. A non-limiting example computer-implemented method includes receiving, by a processor, a request to be processed by a generative system. The computer-implemented method includes using, by the processor, the generative system to generate multiple hypotheses of an output in response to the request, a primary hypothesis of the multiple hypotheses having a highest confidence for the output, multiple secondary hypotheses of the multiple hypotheses having a lower confidence than the highest confidence. The computer-implemented method includes determining, by the processor, at least one region of divergence from the primary hypothesis by the multiple secondary hypotheses, the at least one region of divergence having alternatives in the multiple secondary hypotheses, the alternatives in the multiple secondary hypotheses differing from the primary hypothesis. The computer-implemented method includes generating, by the processor, a graphical user interface displaying the at least one region of divergence in the primary hypothesis and the alternatives in the multiple secondary hypotheses for the at least one region of divergence, the alternatives and the primary hypothesis for the at least one region of divergence being displayed as selectable options for a user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of a displayed summary list according to one or more embodiments of the present invention;

FIG. 7 depicts a user interface highlighting regions of divergence and presenting alternatives for one divergent region according to one or more embodiments of the present invention;

FIG. 8 depicts a user interface highlighting a divergent region and possible alternative translation according to one or more embodiments of the present invention;

FIG. 9 depicts a user interface presenting divergent regions and their potential alternative replacements according to one or more embodiments of the present invention;

FIG. 10A depicts a user interface highlighting multiple divergent regions according to one or more embodiments of the present invention;

FIG. 11 is a flowchart of a computer-implemented method for interactive graphical display of multiple overlapping hypothesis and/or document versions, resulting in a final version translated document for execution as source code according to one or more embodiments of the present invention;

DETAILED DESCRIPTION

Figure 1:
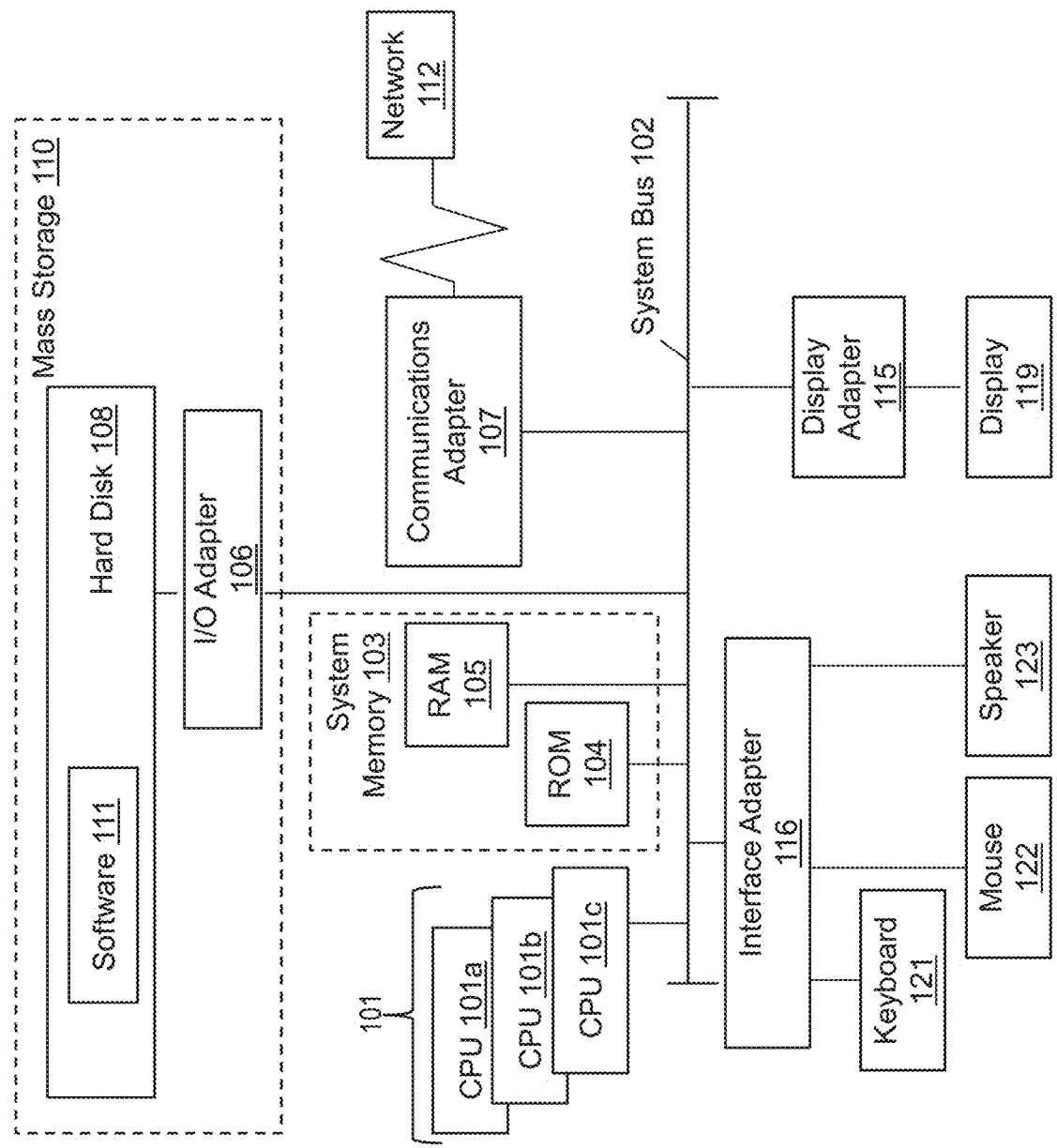
FIG. 1 depicts a block diagram of an example computer system for use in conjunction with one or more embodiments of the present invention.

One or more embodiments of the present invention provide computer-implemented methods, computer systems, and computer program products arranged and configured for interactive graphical display of multiple overlapping hypothesis and/or document versions. For purposes of illustration and explanation, some example scenarios disclose an application of one or more embodiments of the invention in the processing and presentation of results of automatic translation of computer programs from one computer language to another. One or more embodiments provide a graphical user interface in which users can view multiple overlapping hypotheses of a translated and/or transcoded document (but could be applied to multiple overlapping hypotheses of output from any generative system) which has been translated/transcoded from a first language/representation to a second language/representation. According to one or more embodiments of the invention, the graphical user interface initially presents the most confident hypothesis or version (which may be a hypothesis or version chosen by some criteria) on a display screen to the user, identifies regions of commonality between different hypotheses or versions, identifies regions of divergence between different hypotheses or versions, and makes available alternative content for divergent regions. Further, the graphical user interface allows substitution of alternative content in place of the original translated content. By choosing among the alternatives for different divergent regions, effectively treating the alternatives as suggestions which can be accepted or rejected, a user can compose an improved final version. The user is also free to make any other edits or changes to the proposed document in order to correct or improve it independent of any machine-generated suggestions.

Recently, generative techniques have been applied to the realm of software engineering. Leveraging the naturalness hypothesis, code is a form of human communication with similar statistical properties as natural languages. New progress in neural machine translation (NMT) has demonstrated how unsupervised learning techniques can be used to train models that transform source code from one programming language to another. However, code is unique compared to natural languages. For example, code is much more brittle, and swapping even a few characters or tokens can completely change its meaning or effect. In addition, code demands a certain level of correctness. For example, code either compiles or does not, and it is either correct or contains bugs such as logic errors, security flaws, etc.

A variety of computerized applications, particularly those involving machine intelligence or artificial intelligence, may generate multiple possible alternative solutions in the course of performing their processing. This is common in applications such as speech recognition, language translation, and certain deep learning applications. In many cases, these alternatives are minor variations of each other. However, often only the highest confidence alternative is reported to the user, yet the correct alternative might not be the one that the system has the most confidence in. For example, the TransCoder programming language translation system (by FACEBOOK®) may achieve 35% correct translations from Java® to Python® on the most confident translation but has the correct translation among its top 25 translations in 68.7% of the cases. In accordance with one or more embodiments of the invention, users may benefit from having access to multiple hypotheses in order to arrive at a correct result and/or better understand the sources of uncertainty, but they may find it difficult to juggle the multiple hypotheses and keep track of where they differ. The proposed graphical user interfaces can help manage multiple different versions/hypotheses simultaneously and provide display of an understandable and navigable presentation, according to one or more embodiments of the invention.

Various technical benefits and technical solutions are provided by interactive graphical display of multiple overlapping hypothesis and/or document versions of transcoded/translated source code. Source code is executed on a computer system using one or more processors. As noted herein, source code demands a certain level of correctness because code either compiles or does not, is either correct or contains bugs such as logic errors, security flaws, etc., which can cause computer problems when the translated/transcoded source code is executed by the computer system. When a translator/transcoder coverts source code from one programming language like Java, C++, and Python to another for execution by a computer system, there can be differences among the hypotheses or versions of the translated document. The most confident hypothesis/version of translated document is compared to other hypotheses/versions in translated documents, resulting in regions of agreement and divergence. One or more embodiments of the invention graphically display each of the regions of divergence for selection of the best alternative at the region of divergence in order to allow the user to improve the final version of the translated document, which is the translated source code. Moreover, the system is for interactive graphical display of multiple overlapping hypothesis and/or document versions of transcoded/translated source code for selection of the correction alternative at each region of divergence, in order to generate and ultimately execute the final version of the translated source code. Embodiments of the invention are therefore a technical solution to a technical problem, which cannot be performed in the human mind with or without the assistance of pen/paper. Further, by ensuring that the final version of the translated source code has been augmented/improved at the regions of divergence in one or more embodiments of the invention, the improved translated source code can prevent or mitigate a malicious computer attack or intrusion; prevent or mitigate a computer security threat; and provide confidentially and security when translated code is executed. Accordingly, by novel techniques used in aspects of the invention, the functioning of the computer system itself is improved, as well as the functioning of multiple computer systems interconnected in a cloud environment, all of which can prevent potential exposure to a future or present computer issue.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
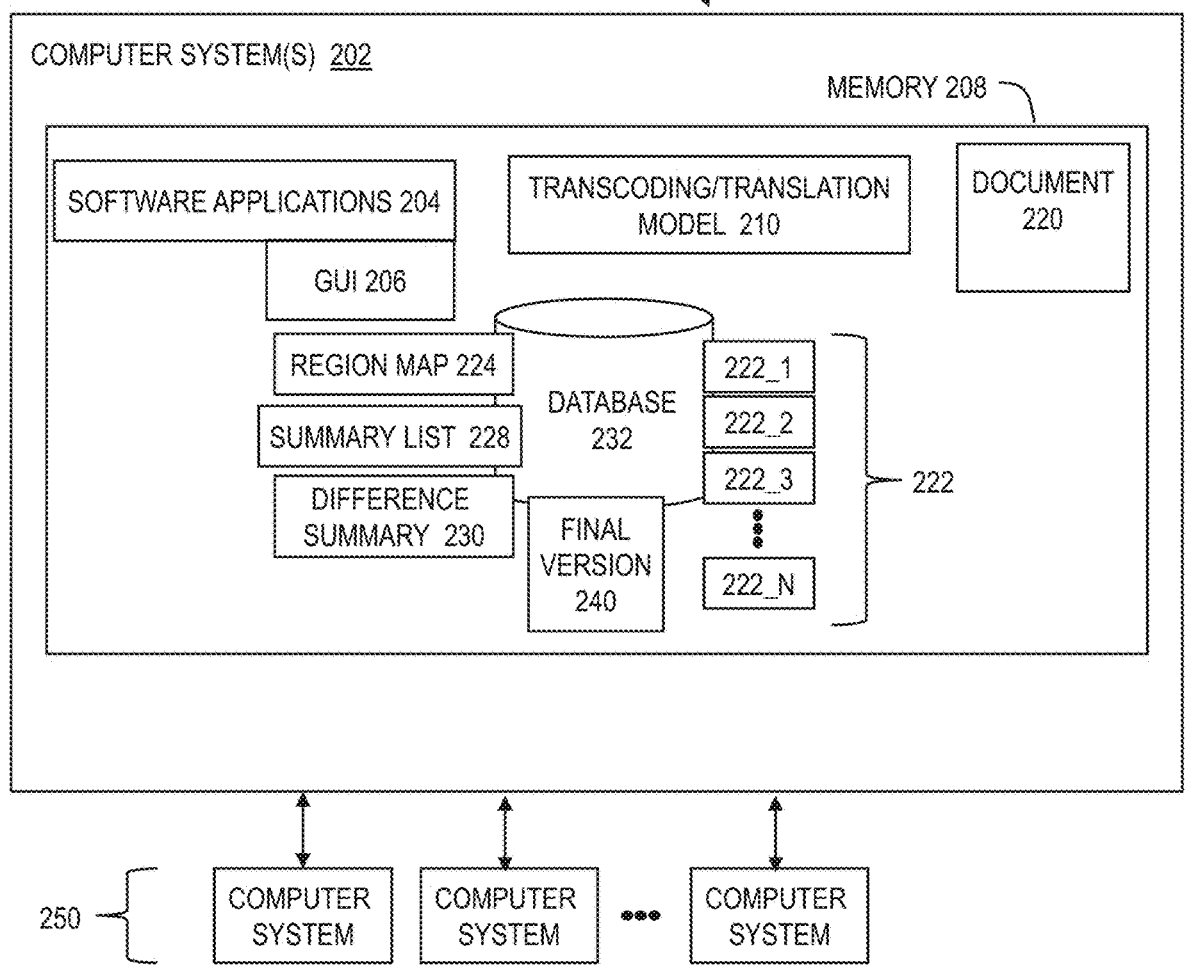
FIG. 2 depicts a block diagram of an example computing environment which is configured to generate and provide an interactive graphical display of multiple overlapping hypothesis and/or document versions of transcoded/translated source code for selection according to one or more embodiments of the present invention.

FIG. 2 is a block diagram of an example computing environment 200 which is configured to generate and provide an interactive graphical display of multiple overlapping hypothesis and/or document versions of transcoded/translated source code for selection of the correct alternative at each region of divergence, in order to generate and execute the final version of the translated source code according to one or more embodiments of the inventions. Computing environment 200 can include computer system(s) 202 and computer systems 250, which may include any of the hardware and software components and functionality discussed in computer system 100 of FIG. 1. Similarly, software applications 204 of computer system 202 may include functionality of software 111 for execution/processing on processors 101 to operate and function according to one or more embodiments discussed herein. Additionally, computer system 202 may include processors 101 (not shown in FIG. 2) and memory 208. Memory 208 can include and/or be representative of any type of storage, system memory, hard disk, etc., discussed herein. Computer environment 200 may be representative of one or more portions of a cloud computing environment. Functions of computing environment 200 can use and/or be implemented in workloads of workload layer 90 and any of the components of hardware and software layer 60 depicted in FIG. 13.

Figure 3:
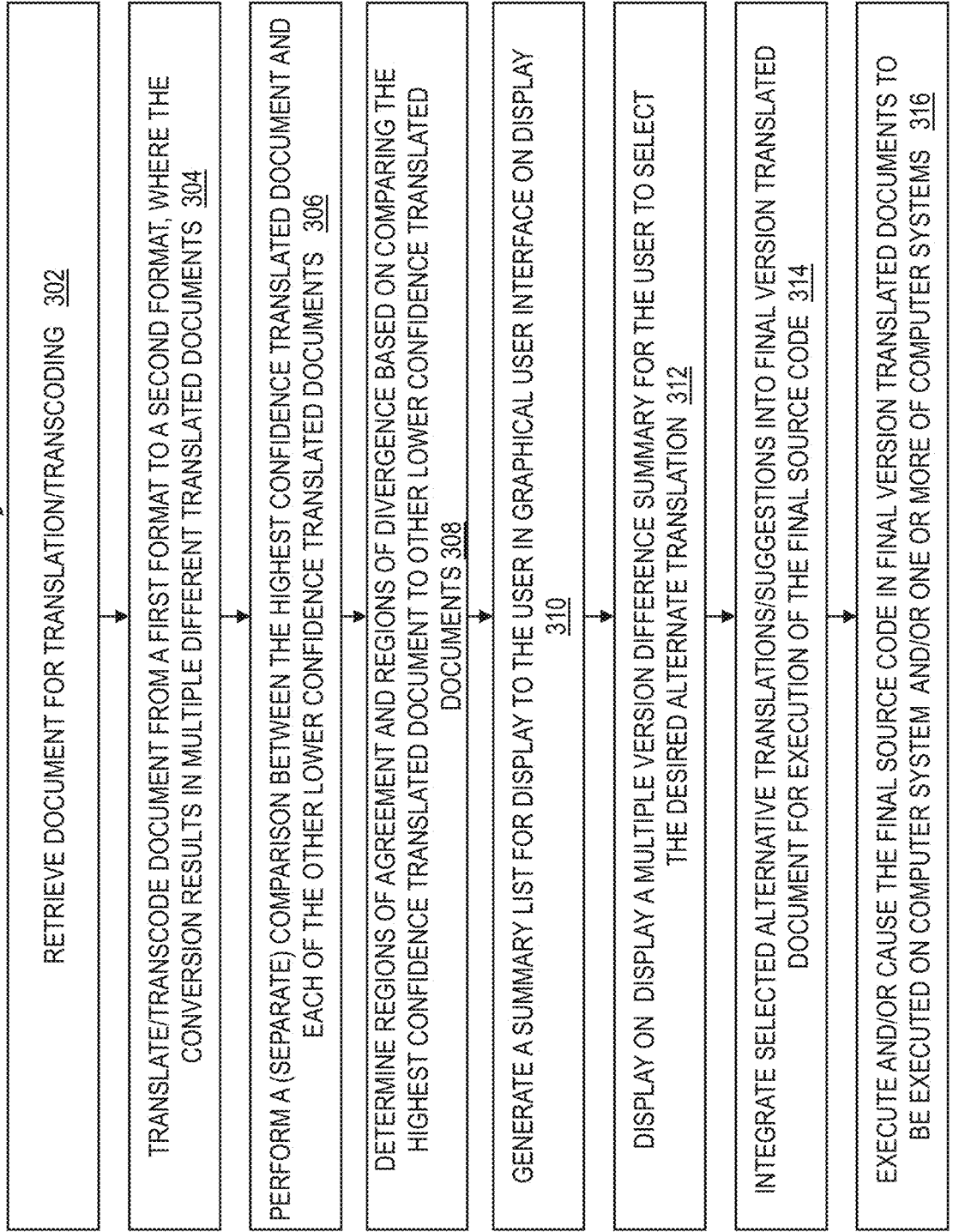
FIG. 3 is a flowchart of a computer-implemented process for generating and displaying an interactive graphical display of multiple overlapping hypothesis and/or document versions of transcoded/translated source code for selection according to one or more embodiments of the present invention.

FIG. 3 is a flowchart of a computer-implemented process 300 for generating and displaying an interactive graphical display of multiple overlapping hypothesis and/or document versions of transcoded/translated source code for selection of the correct alternative at each region of divergence, in order to generate and execute the final version of the translated source code in accordance with one or more embodiments. Computer-implemented process 300 is executed by computer system 202 in FIG. 2 which will be described with further.

At block 302 of computer-implemented process 300, software application 204 executing on computer system 202 is configured to retrieve document 220 for translation/transcoding. Document 220 may be stored in memory 208. Software application 204 may receive and/or request document 220 from one of the computer systems 250. Document 220 can contain data in one format that is to be converted to another, different format that is usable by a computer system. For explanation purposes, document 220 can be a file, such as a computer-executable file, which contains source code in a first programming language that is to be converted to a second program language different from the first programming language, where the first programming language and the second programming language are configured to be executed by a processor. Document 220 is utilized for explanation purposes and ease of understanding, and it should be appreciated that one or more embodiments of the invention are not meant to be limited. In one or more embodiments, document 220 may refer to a general input and/or a request to a generative system. The input to the generative system may include natural language descriptions, data, sensor readings, computer code, a chemical formula, a diagram, natural speech, an image, etc. Additional examples of input to the generative system may include speech recognition (e.g., translation of audio input to text), musical transcription (e.g., translation of audio input to musical notation), natural language translation, and other forms of text generation. Although example scenarios may use the output side as a textual output, it should be recognized that one or more embodiments could have an output of more than a textual output in which differences can be computed over; the output can be segmented into regions where the corresponding regions are established in different alternatives as discussed further herein. The output can include natural language descriptions, data, sensor readings, computer code, a chemical formula, a diagram, natural speech, an image, etc.

At block 304, software application 204 is configured to translate/transcode document 220 from a first format to a second format, and this conversion results in multiple different translated documents 222_1, 222_2, 222_3, through 222_N, wherein N represents the last of the multiple documents. Multiple translated documents 222_1, 222_2, 222_3, through 222_N can be generally referred to as multiple translated documents 222. Multiple translated documents 222 are multiple hypotheses and/or versions of document 220 which has been translated from, for example, the first programming language to the second programming language, where each translated document 222 is different and/or a different version of the output resulting from translating/transcoding the same document 220. For explanation purposes, software application 204 determines that translated document 222_1 has the highest confidence in translation to the second programing language, which may use any standard criteria for determining the confidence such as a confidence score. Accordingly, the other translated documents 222_2 through 222_N have a lower confidence. The original document 220 might be a Java® document for instance, and the multiple translated documents 222 could are all be Python® documents. Multiple translated documents 222 are all different versions of/from each other; lower confidence translated documents 222_2 through 222_N are different versions of the highest confidence translated document 222_1.

Software application 204 may call and/or employ a standard translation/transcoding program or generative model to translate document 220 from the first programming language to the second programming language. For example, software application 204 may use a transcoder such as transcoding/translation model 210. In one or more embodiments, transcoding/translation model 210 can be a generative model. Transcoding/translation model 210 can be a trained model that uses machine learning. Transcoding/translation model 210 can include the functionally of transcoders as understood by one of ordinary skill in the art, such as but not limited to TransCoder which uses a generative model for unsupervised neural machine translation (NMT) as understood by one of ordinary skill in the art. Although transcoding/translation model 210 is illustrated for explanation purposes, any generative system/model can be used.

The generative system/model may be based on a machine learning model. The generative system/model could include an algorithm, a rule-based system, and/or any other form of intelligent generative system capable of producing multiple alternative versions of output for consideration.

Figure 4:
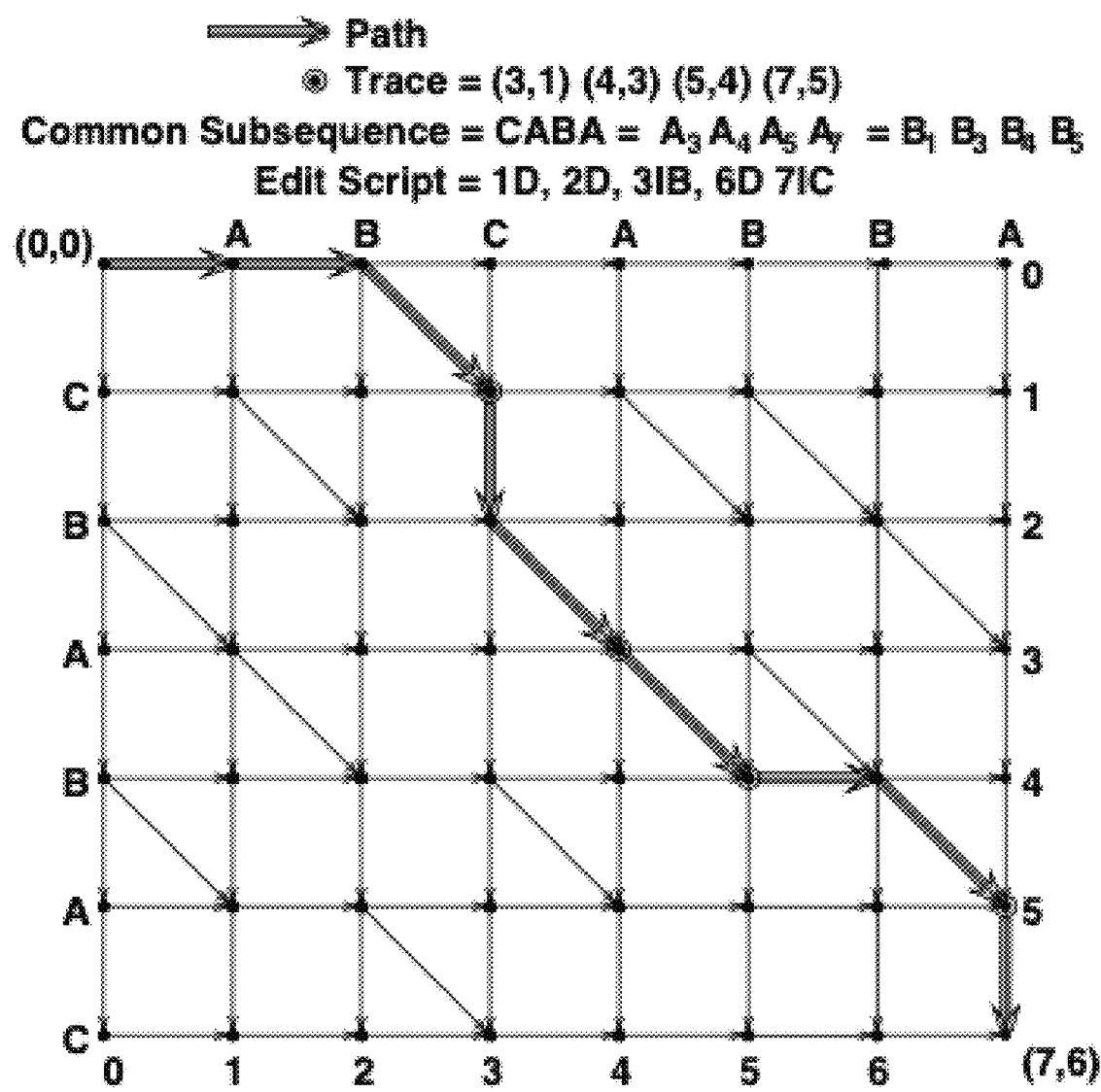
FIG. 4 depicts a block diagram of detecting differences using a dynamic programming difference computation according to one or more embodiments of the present invention.

At block 306, software application 204 is configured to perform a (separate) comparison between the highest confidence translated document 222_1 and each of the other lower confidence translated documents 222_2 through 222_N. Software application 204 may perform and/or call one or more other software applications to perform a pairwise comparison between translated document 222_1 and each of the other translated documents 222_2 through 222_N to determine each of the differences (and similarities) in the other versions (i.e., translated documents 222_2 through 222_N) as compared to the highest confidence translated document 222_1. Software application 204 may use and/or employ standard comparison algorithms, as understood by one of ordinary skill in the art. As depicted in FIG. 4, software application 204 may use and/or employ Myers's algorithm to separately compare the highest confidence translated document 222_1 to the other lower confidence translated documents 222_2 through 222_N. As seen in FIG. 4, software application 204 is configured to compute a difference path, which is a series of insertions and deletions that convert the reference version (e.g., translated document 222_1) into the alternate version. In one or more embodiments, software application 204 can use the Myer's algorithm to compute the least-cost sequence of insertions and deletions to convert the string of characters or tokens across the top to the string of characters or tokens on the left, although other algorithms could be utilized. In the example in FIG. 4, this illustration is converting the character sequence "ABCABBA" to "CBABAC". There are many different sequences of insertions and deletions that could achieve this transformation, but if it is established that each insertion and deletion has a constant cost associated with it, then some sequences are more expensive than others. Each sequence is represented by a path through the matrix. For example, one approach could delete all the characters in the first string, and then insert all the characters in the second string. That would be the path that runs along the top and then down the right hand side and would cost 13 assuming a cost of 1 for each insertion or deletion. The least cost path in this case, only requires 3 deletions and 2 insertions, for a cost of 5. Diagonal traversals take advantage of commonality between the source and target strings, resulting in 0 incremental cost. Myer's algorithm computes this least-cost path, as shown in the diagram.

Figure 5:
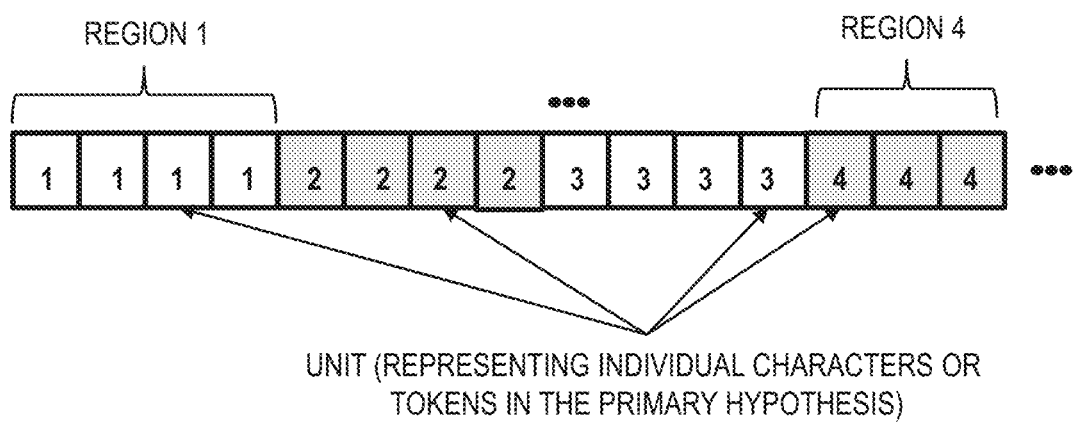
FIG. 5 depicts a block diagram of a displayed region map of all the regions of agreement and regions of divergence for the highest confidence translated document according to one or more embodiments of the present invention.

At block 308, software application 204 is configured to determine regions of agreement and regions of divergence based on the comparison of the highest confidence translated document 222_1 to other lower confidence translated documents 222_2 through 222_N, all of which are from multiple translated documents 222 in database 232. Software application 204 is configured to generate a region map 224 of all the regions of agreement and regions of divergence for the highest confidence translated document 222_1, as depicted in FIG. 5. Region map 224 is generated and maintained for each unit of the reference version, which is the highest confidence translated document 222_1. A unit is a character and/or token in the highest confidence translated document 222_1. A character can be an individual letter and/or individual letters used to make a string. A token can be a word, a string a characters (like a variable name), keywords, etc. A token can also be a subword sequence of characters such as a syllable. Any unit for which there is an insertion or deletion in any pairwise comparison with the reference version is part of a region of divergence in region map 224. Any unit for which there are no insertion or deletions in any of the pairwise comparisons is part of a region of agreement in region map 224. In some implementations, small regions of agreement can be merged into adjoining regions of divergence, thereby becoming a region of divergence. In one example, there could be 25 or 100 multiple translated documents 222, and there could be a unit in the highest confidence translated document 222_1, corresponding to the other translated documents 222. Software application 204 is configured to display on display 119 the region map 224 in conjunction with the highest confidence translated document 222_1 in a graphical user interface 206. In one or more embodiments, the user utilizing a mouse 122, keyboard 121, etc., can move a pointer or cursor to select (e.g., hover over, right click, etc.) an individual region of divergence from the region map 224 in order to view the display of an alternative translation for that particular region in graphical user interface 206. FIG. 5 illustrates how adjacent units are combined by assigning them identical region numbers into individual regions of agreement or divergence. In addition to displaying the alternative translation for the unit in a region on display 119, software application 204 can be configured to display a link to the other translated document, for example, translated document 222_2, a portion of the translated document 222_2 in which the alternative translation is located, a thumbnail of the translated document 222_2, and/or an entirety of the translated document 222_2 with the alternative translation of the region clearly marked, highlighted, bolded, encircled, etc. As displayed in graphical user interface 206 on display 119, software application 204 is configured to display an option for the user to select the alternative translation for the region in the translated document 222_2 to be utilized in place of the provided translation for the divergent region in the highest confidence translated document 222_1. In response to the user selecting the alternative translation for the region in the translated document 222_2, software application 204 is configured to utilize the alternative translation for the region in the translated document 222_2 in a final version translated document 240 in place of the primary translation of the region in the highest confidence translated document 222_1.

Although only a few regions of divergence are illustrated in region map 224 for explanation purposes, region map 224 could have numerous regions of divergence, and the graphical user interface 206 is configured to display on display 119 the alternative translations for each of the divergent regions when the user selects a divergent region in region map 224 for display of the alternative translation. The region map 224 is used to construct the region summary list 228, which is used by graphical user interface 206 to present results to the user, demarcating regions of divergence and presenting alternatives for those regions.

At block 310, software application 204 is configured to generate a summary list 228 for display to the user in graphical user interface 206 on display 119, where summary list 228 can be a data structure of all computations across all the alternative translations. FIG. 6 depicts display of an example summary list 228 on display 119 in accordance with one or more embodiments. The region map 224 plus the N−1 difference paths can be used to construct a summary of the N hypotheses or different versions. In one or more embodiments, summary list 228 can be generated as a list of the consecutive regions (e.g., both regions of agreement and regions of divergence) with all of the alternative translations listed for each region. In one or more embodiments, summary list 228 can be generated with various regions of divergence only.

Further, each alternative translation for a region can indicate how many of the translated documents 222 (e.g., hypotheses of versions) agree with it for this region. The fraction of supporting hypotheses/versions can serve as a form of confidence in the alternative translation. Summary list 228 can also have another form of confidence based on the (e.g., average, minimum, and/or some other mathematical function of the) confidence of its constituents if that information is available.

In FIG. 6, summary list 228 displays the highest confidence translated document 222_1 contents for each region in the first column with each of its translations for the corresponding region in subsequent columns. The alternative translations from alternative translated documents 222 are currently displayed for the same region in the same row such that the user can select the desired translation for the final version translated document 240. In FIG. 6, region 1 shows that this is a region of agreement because the primary translation in highest confidence translated document 222_1 and the alternative translations in alternative translated documents 222_2 through 222_N are all the same. However, region 2 shows that this is within a region of divergence. In graphical user interface 206, the user can select the desired translation by, for example, highlighting and double clicking using a mouse or keyboard, on the desired translation originating in a particular row and column. Also, the user can view the portion of the desired translation in context within the particular translated document 222 by, for example, right clicking and/or hovering over the desired translation in the column and row of summary list 228, such that software application 204 retrieves and displays the particular translated document 222 having its translated selected. Regions and units are not the same. As noted herein, a unit is a character or token that comprises a document. A region is a sequence of consecutive characters or tokens. Software application 204 is consolidating the regions that are common between the documents and the regions that differ between them for display to the user. While the representation of the summary in FIG. 6 is rendered in a tabular fashion, it could also be represented as a list or sequence of region descriptions, each of which enumerates the identified alternative values for that region and the hypotheses or versions associated with each alternative value.

At block 312, software application 204 is configured to display on display 119 a multiple version difference summary 230 for the user to select the desired alternative translation. Multiple version difference summary 230 can be displayed to the user on display 119 in many formats with varied techniques for user interaction as depicted in FIGS. 7, 8, 9, 10, and 11, and any of the formats can be combined together in graphical user interface 206. FIG. 7 is a rendering of an example of graphical user interface 206 displaying a multiple version difference summary 230 in accordance with one or more embodiments. The text of the reference version, which is highest confidence translated document 222_1 in the examples, can be displayed normally. Portions of the text corresponding to regions of divergence can be highlighted in some way, for example, as depicted by highlighted regions 702. Interaction with highlighted regions 702 (such as clicking, hovering, etc.) can reveal alternatives considered or suggested in lower confidence translated documents 222_2 through 222_N. In FIG. 7, graphical user interface 206 displays box 704 which displays alternative translations for selection by the user. Choosing an alternative translation causes software application 204 to substitute the alternative translation for the region (i.e., the primary translation) in the text.

FIG. 8 is a rendering of an example of graphical user interface 206 displaying a multiple version difference summary 230 in accordance with one or more embodiments. In FIG. 8, graphical user interface 206 can display on display 119 multiple version difference summary 230 with a side-bar 802 where suggestions about alternative translations can be provided in suggestion boxes 804 in of side-bar 802. Software application 204 is configured for the user to select using a cursor, keyboard, etc., a particular suggestion in suggestion box 804 for the highlighted region 806 which is the corresponding divergent region in the text displayed in multiple version difference summary 230. In suggestion box 804, the user can accept the suggestion for highlighted region 806 by clicking on the check or reject the suggestion by clicking on the X. If accepted, software application 204 is configured to replace the divergent highlighted region 806 with the suggested value in suggestion box 804. Beneficially, side-bar 802 can be used for communication and selection by the user of other issues in addition to alternative translations, where the other issues can include consistency, documentation, etc., in respective suggestion boxes 804. Moreover, software application 204 is configured to act as a collaborative assistant who is watching the development process and making suggestions that the user can either accept or reject.

FIG. 9 is a rendering of an example of graphical user interface 206 displaying a multiple version difference summary 230 in accordance with one or more embodiments. In FIG. 9, graphical user interface 206 can display on display 119 multiple version difference summary 230 with the alternatives as inline suggestions 902. An entire line of code is presented with an alternative inline suggestion 902 of one of the lower confidence translated documents 222_2 through 222_N which could be accepted for replacement of the primary translation of highest confidence translated document 222_1 or rejected. By having the display 119 present a screen having both the primary translation of highest confidence translated document 222_1 and alternative inline suggestions 902, there could be a case where multiple alternative inline suggestions 902 could become unwieldy. Accordingly, software application 204 provides the ability for the user to optionally select display of the top number (e.g., top 5) of lower confidence translated documents 222_1 through 222_N, top percentage (e.g., top 25%) of lower confidence translated documents 222_1 through 222_N, etc.

Figure 10B:
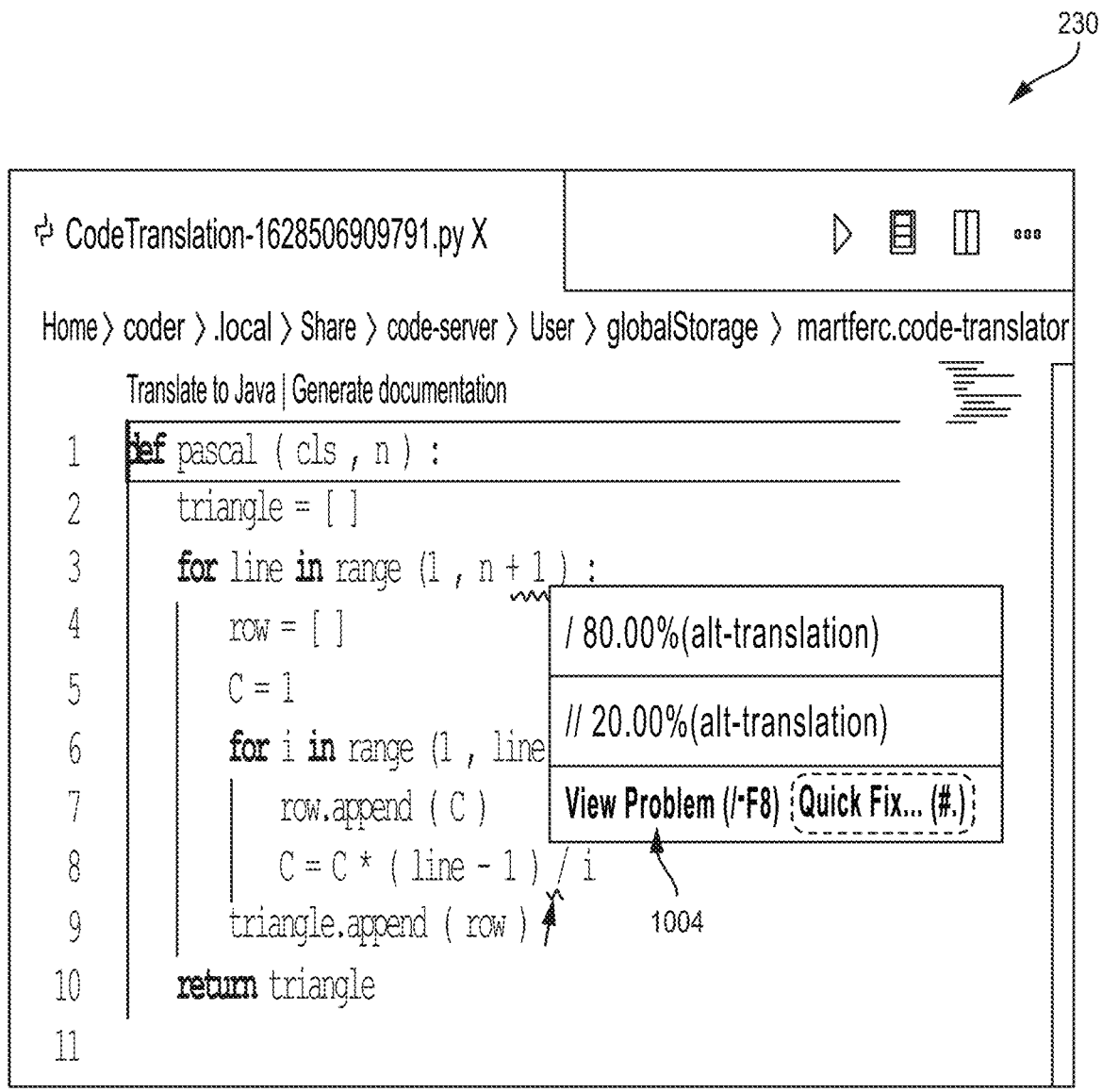
FIG. 10B depicts a user interface highlighting multiple divergent regions and presenting alternatives for one divergent region according to one or more embodiments of the present invention.

FIGS. 10A and 10B are rendering of an example of graphical user interface 206 displaying a multiple version difference summary 230 in accordance with one or more embodiments. In FIG. 10A, graphical user interface 206 can display on display 119 multiple version difference summary 230 with highlighted divergent regions 1002 for the multiple translations of the source code in document 220. In this example, software application 204 is configured to depict each highlighted divergent region 1002 with a squiggly line, although other means of highlighting could be used.

When the user hovers over one of these highlighted divergent regions 806, FIG. 10B illustrates the alternatives are displayed in suggestion box 1004. In this particular example, software application 204 is considering whether to use floating point division (/) or integer division (//) in suggestion box 1004. While more of the translations appear to go with floating point division (e.g., 80% of them), the integer division is actually the correct choice. Selecting "quick fix" allows the user to indicate which option to select for the divergent region 806. For example, the user can select integer division (//) and then select "quick fix" to cause the replacement of the primary translation of highest confidence translated document 222_1.

At block 314, software application 204 is configured to integrate selected alternative translations/suggestions into a final version translated document 240 for execution of the final source code. For example, software application 204 can compile each of the selections made by the user from any of the example graphical displays that have been presented to the user and integrate these selections in final version translated documents 240. At block 316, software application 204 is configured to execute and/or cause the final source code in final version translated documents 240 to be executed on computer system 202 and/or one or more of computer systems 250. In one or more embodiments, software application 204 can send final version translated document 240 to one or more of computer systems 250 and cause the final source code to be executed.

FIG. 11 is a flowchart of a computer-implemented method 1100 for interactive graphical display of multiple overlapping hypothesis and/or document versions, resulting in a final version translated document 240 for execution as source code in accordance with one or more embodiments of the invention. Computer-implemented method 1100 may be performed using computer system 202 in FIG. 2. Functions of computer systems can use and/or implemented in hardware components of hardware and software layer 60 and/or workloads of workload layer 90 depicted in FIG. 13.

At block 1102 of computer-implemented method 1100, software application 204 of computer system 202 is configured to receive a document (e.g., source code document 220, request, etc.) to be processed by a machine learning model (e.g., transcoding/translation model 210, a generative system).

At block 1104, software application 204 of computer system 202 is configured to use, call, and/or employ the machine learning model (e.g., transcoding/translation model 210, a generative system) to generate multiple hypotheses (e.g., multiple different translated documents 222) (e.g., as an output) regarding a translation of the document (e.g., source code document 220, request, etc.) from a first language to a second language. A primary hypothesis (e.g., translated document 222_1) of the multiple hypotheses has a highest confidence for translation to the second language, and multiple secondary hypotheses (e.g., translated documents 222_2 through 222_N) of the multiple hypotheses has a lower confidence than the highest confidence of the primary hypothesis.

At block 1106, software application 204 of computer system 202 is configured to determine at least one region of divergence (e.g., depicted in FIGS. 5, 6, 7, 8, 9, 10A, and 10B) from the primary hypothesis (e.g., highest confidence translated document 222_1) by the multiple secondary hypotheses (e.g., lower confidence translated documents 222_2 through 222_N), the at least one region of divergence having alternatives in the multiple secondary hypotheses, the alternatives in the multiple secondary hypotheses differing from the corresponding region in the primary hypothesis. The alternatives are alternative translations discussed herein.

At block 1108, software application 204 of computer system 202 is configured to generate a graphical user interface 206 displaying the at least one region of divergence in the primary hypothesis and the alternatives in the multiple secondary hypotheses for the at least one region of divergence, the alternatives and the primary translation for the at least one region of divergence being displayed as selectable options (e.g., depicted in FIGS. 5, 6, 7, 8, 9, 10A, and 10B) for a user.

The multiple hypotheses (e.g., multiple different translated documents 222) are related to the translation of a corpus of natural language in the document/request from the first language to the second language. In the example scenario, the translation is of a computer program document written in one programming language and is translated to multiple alternative computer programs written in another programming language, with the goal being that the translated programs implement equivalent functionality. In other applications, the input could be text in a natural language to be translated to a different natural language, a natural language request that results in the generation of a program to implement a program that satisfies that request, and/or some other form of request that results in some kind of generated output. The at least one region of divergence comprises one or more units (e.g., units in FIGS. 5 and 6) for which there is difference in translation of the document 220 between the primary hypothesis and the multiple secondary hypotheses (e.g., between the highest confidence translated document 222_1 and the lower confidence translated documents 222_2 through 222_N). The at least one region of divergence comprises one or more units, a unit in the one or more units relating to a character in the second language. The at least one region of divergence comprises one or more units, a unit in the one or more units relating to a token in the second language. The first language is a first type of computer-executable code and the second language is a second type of computer-executable code different from the first type of computer-executable code. The document/request and the generated multiple hypothesis (e.g., output) comprises material, the material being selected from the group including, but not limited to, natural language text, computer code, chemical formulae, diagrams, natural speech or other audio, and images. The output comprises material, differences in the material being separable into regions for display and selection by the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
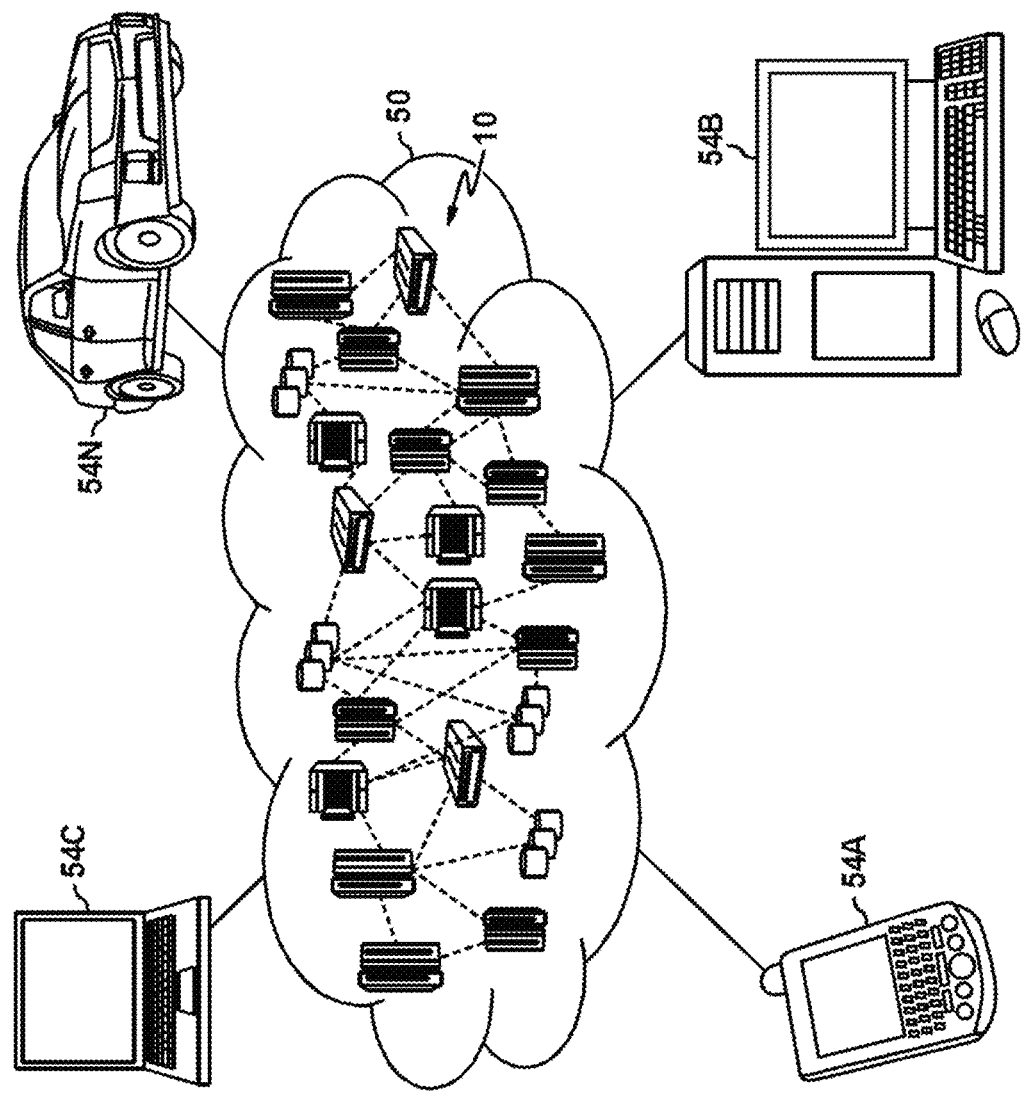
FIG. 12 depicts a cloud computing environment according to one or more embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
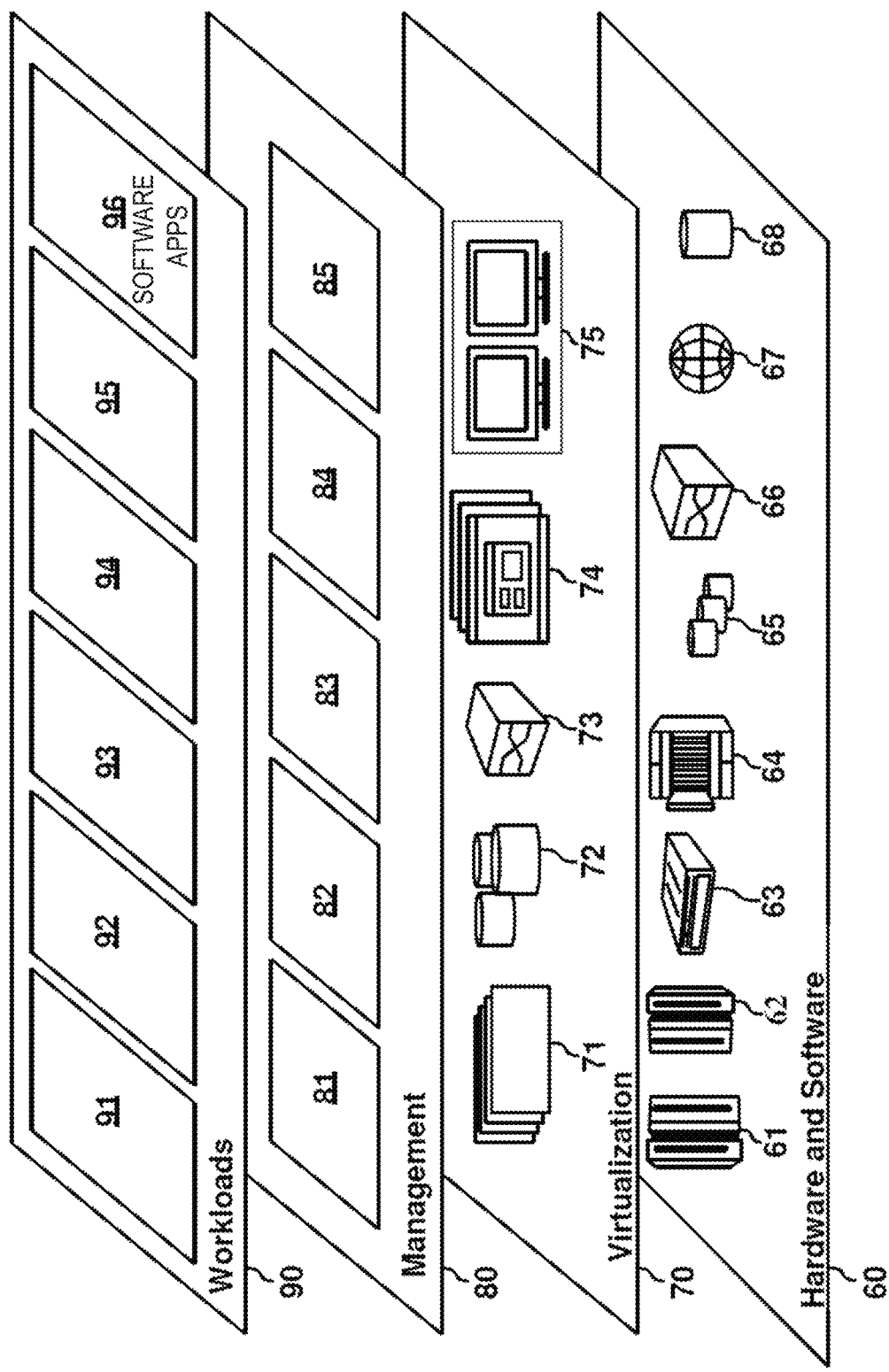
FIG. 13 depicts abstraction model layers according to one or more embodiments of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications in and/or performs various functions of computer systems 202, computer systems 250, etc., discussed herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a request to be processed by a generative system;
using, by the processor, the generative system to generate multiple hypotheses of an output in response to the request, a primary hypothesis of the multiple hypotheses having a highest confidence for the output, multiple secondary hypotheses of the multiple hypotheses having a lower confidence than the highest confidence;
determining, by the processor, at least one region of divergence from the primary hypothesis by the multiple secondary hypotheses, the at least one region of divergence having alternatives in the multiple secondary hypotheses, the alternatives in the multiple secondary hypotheses differing from the primary hypothesis;
generating, by the processor, a graphical user interface displaying the at least one region of divergence in the primary hypothesis and the alternatives in the multiple secondary hypotheses for the at least one region of divergence, the alternatives and the primary hypothesis for the at least one region of divergence being displayed as selectable options for a user;
wherein a selection of one of the alternatives from the selectable options automatically substitutes the one of the alternatives at the at least one region of divergence being displayed;
wherein the multiple hypotheses are related to a translation of the request from a first representation to a second representation, the first representation comprising a first type of computer-executable code and the second representation comprising a second type of computer-executable code different from the first type of computer-executable code; and
causing the second type of computer-executable code, along with any selection of the selectable options, to be executed.

2. The computer-implemented method of claim 1, wherein the multiple hypotheses are related to a translation of a corpus in a language in the request from a first representation to a second representation.

3. The computer-implemented method of claim 1, wherein the at least one region of divergence comprises a unit for which there is a difference in the output between the primary hypothesis and the multiple secondary hypotheses.

4. The computer-implemented method of claim 1, wherein the at least one region of divergence comprises one or more units.

5. The computer-implemented method of claim 1, wherein one or more units in the at least one region of divergence relates to a character or token in the primary hypothesis.

6. The computer-implemented method of claim 1, wherein the output comprises material, differences in the material being separable into regions for display and selection by the user.

7. A computer system comprising:
a memory having computer readable instructions; and
one or more processors for executing the computer readable instructions, the computer readable instructions controlling the one or more processors to perform operations comprising:
receiving a request to be processed by a generative system;
using the generative system to generate multiple hypotheses of an output in response to the request, a primary hypothesis of the multiple hypotheses having a highest confidence for the output, multiple secondary hypotheses of the multiple hypotheses having a lower confidence than the highest confidence;
determining at least one region of divergence from the primary hypothesis by the multiple secondary hypotheses, the at least one region of divergence having alternatives in the multiple secondary hypotheses, the alternatives in the multiple secondary hypotheses differing from the primary hypothesis;
generating a graphical user interface displaying the at least one region of divergence in the primary hypothesis and the alternatives in the multiple secondary hypotheses for the at least one region of divergence, the alternatives and the primary hypothesis for the at least one region of divergence being displayed as selectable options for a user;
wherein a selection of one of the alternatives from the selectable options automatically substitutes the one of the alternatives at the at least one region of divergence being displayed;
wherein the multiple hypotheses are related to a translation of the request from a first representation to a second representation, the first representation comprising a first type of computer-executable code and the second representation comprising a second type of computer-executable code different from the first type of computer-executable code; and
causing the second type of computer-executable code, along with any selection of the selectable options, to be executed.

8. The system of claim 7, wherein the multiple hypotheses are related to a translation of a corpus in a language in the request from a first representation to a second representation.

9. The system of claim 7, wherein the at least one region of divergence comprises a unit for which there is a difference in the output between the primary hypothesis and the multiple secondary hypotheses.

10. The system of claim 7, wherein the at least one region of divergence comprises one or more units.

11. The system of claim 7, wherein one or more units in the at least one region of divergence relates to a character or token in the primary hypothesis.

12. The system of claim 7, wherein the output comprises material, differences in the material being separable into regions for display and selection by the user.

13. A computer program product comprising a computer readable storage medium having program instructions embodied therewith, the program instructions executable by one or more processors to cause the one or more processors to perform operations comprising:
receiving a request to be processed by a generative system;
using the generative system to generate multiple hypotheses of an output in response to the request, a primary hypothesis of the multiple hypotheses having a highest confidence for the output, multiple secondary hypotheses of the multiple hypotheses having a lower confidence than the highest confidence;
determining at least one region of divergence from the primary hypothesis by the multiple secondary hypotheses, the at least one region of divergence having alternatives in the multiple secondary hypotheses, the alternatives in the multiple secondary hypotheses differing from the primary hypothesis;
generating a graphical user interface displaying the at least one region of divergence in the primary hypothesis and the alternatives in the multiple secondary hypotheses for the at least one region of divergence, the alternatives and the primary hypothesis for the at least one region of divergence being displayed as selectable options for a user;
wherein a selection of one of the alternatives from the selectable options automatically substitutes the one of the alternatives at the at least one region of divergence being displayed;
wherein the multiple hypotheses are related to a translation of the request from a first representation to a second representation, the first representation comprising a first type of computer-executable code and the second representation comprising a second type of computer-executable code different from the first type of computer-executable code; and
causing the second type of computer-executable code, along with any selection of the selectable options, to be executed.

14. The computer program product of claim 13, wherein the multiple hypotheses are related to a translation of a corpus in a language in the request from a first representation to a second representation.

15. The computer program product of claim 13, wherein the at least one region of divergence comprises a unit for which there is a difference in the output between the primary hypothesis and the multiple secondary hypotheses.

16. The computer program product of claim 13, wherein the at least one region of divergence comprises one or more units.

17. The computer program product of claim 13, wherein one or more units in the at least one region of divergence relates to a character or token in the primary hypothesis.

* * * * *